S. ALBRIGHT.
Machines for Upsetting Tire.
No. 153,998. Patented Aug. 11, 1874.
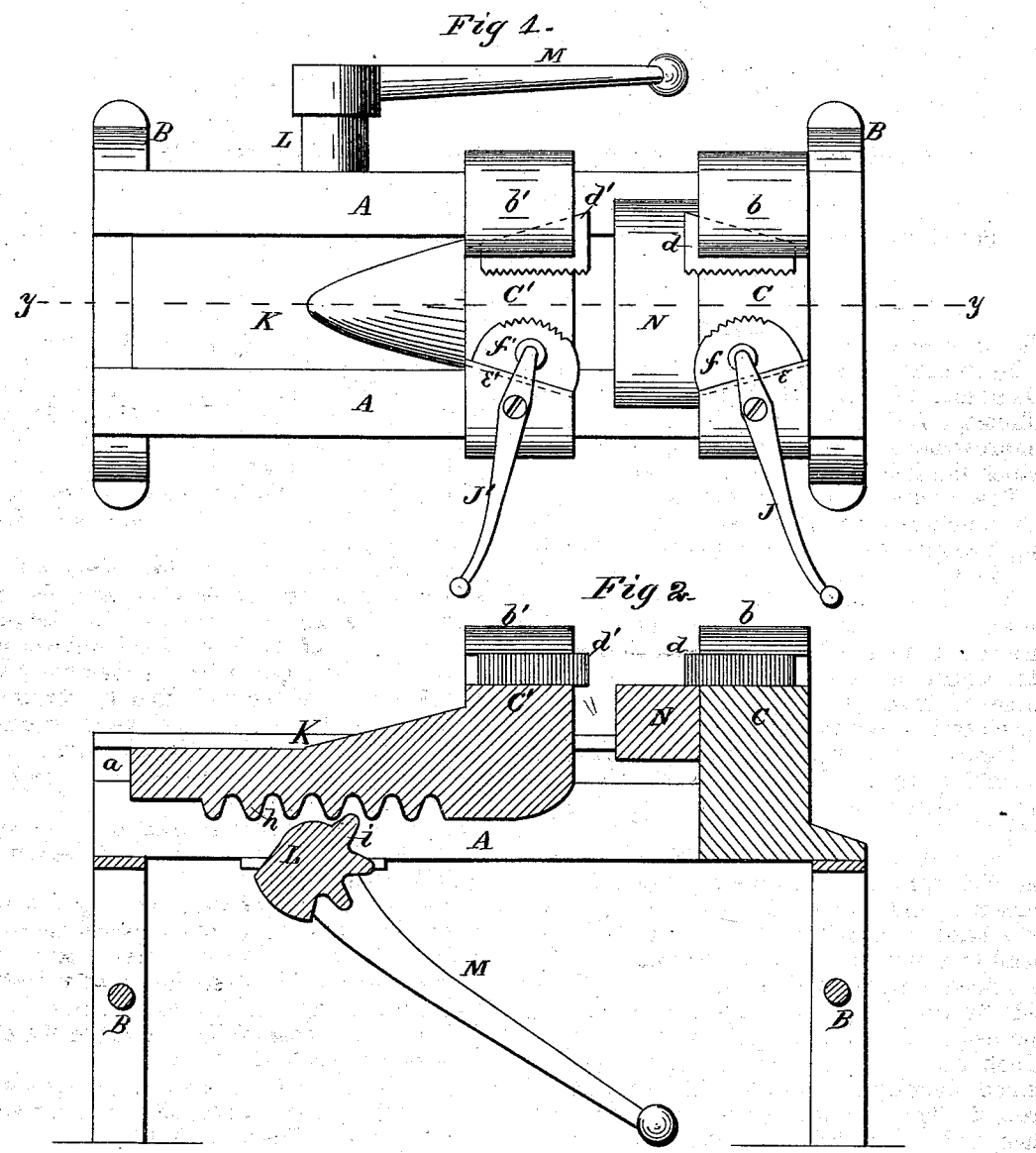

UNITED STATES PATENT OFFICE.

SAMUEL ALBRIGHT, OF DAMASCUS, ILLINOIS.

IMPROVEMENT IN MACHINES FOR UPSETTING TIRES.

Specification forming part of Letters Patent No. 153,998, dated August 11, 1874; application filed July 6, 1874.

*To all whom it may concern:*

Be it known that I, SAMUEL ALBRIGHT, of Damascus, county of Stephenson and State of Illinois, have invented certain new and useful Improvements in Tire-Shrinking Machine, of which the following is a specification:

The nature of my invention consists in the construction and arrangement of a tire-shrinking machine, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a plan view of my machine for shrinking tires. Fig. 2 is a longitudinal vertical section of the same through the line $y\,y$, Fig. 1.

The bed of my machine is formed of two parallel bars, A A, supported upon feet or legs B B, and connected at one end by means of a head or cross-bar, C. At one end of the head C is formed an inward-projecting jaw, $b$, provided with an inclined groove on its inner side for the reception of a wedge, $d$, which is toothed on its outer face, as shown in Fig. 1. Upon the other end of the head C is an inclined shoulder, $e$, against which is placed a cam, $f$. This cam is also toothed on its outer face, and is pivoted to the end of a lever, J, which lever is pivoted on top of the head at the end, as shown. In the grooves $a\,a$ on the bars A A is placed a slide, K, formed with a head, C', at its inner end, said head being provided with jaw $b'$, wedge $d'$, shoulder $e'$, cam $f'$, and lever J', precisely like the head C, except that the inclination of the groove in the jaw and of the shoulder run in a reverse direction. On the under side of the slide K is formed or attached a rack-bar, $h$, into which gears a quarter-pinion, $i$, on a shaft, L, having its bearings in suitable boxes on the under edges of the bars A A. On one end of the shaft L is placed a lever, M.

The tire to be shrunk, after being heated, is placed upon the heads C C', and clamped firmly by the cams $f\,f'$ against the wedges $d$ $d'$. By means of the lever M the quarter-pinion $i$ is thrown in gear with the rack-bar $h$ and the slide K forced forward, thereby shrinking or upsetting the tire as much as is required. Between the heads C C' on the bars A A is placed a block, N, to prevent the tire from bending downward.

Having thus fully described my invention, what I claim as new, and desire to secure by Letters Patent, is—

The combination of the head C, jaw $b$, provided with inclined groove, toothed wedge $d$, inclined shoulder $e$, toothed cam $f$, and lever J, all constructed as described, and operating in connection with similar devices on a movable head, C', substantially as and for the purposes herein set forth.

In testimony that I claim the foregoing as my invention, I hereunto affix my signature this 29th day of June, A. D. 1874.

SAMUEL ALBRIGHT.

Witnesses:
JAMES BYRNE,
JAMES M. PHILLIPS.